A. H. MIDGLEY.
ELECTRIC STARTER.
APPLICATION FILED JULY 10, 1915.

1,274,575.

Patented Aug. 6, 1918.

Witnesses:

A. H. Midgley
Inventor:
by
Attorney:

UNITED STATES PATENT OFFICE.

ALBERT HENRY MIDGLEY, OF ACTON VALE, ENGLAND, ASSIGNOR OF ONE-HALF TO CHARLES ANTHONY VANDERVELL, OF ACTON VALE, ENGLAND.

ELECTRIC STARTER.

1,274,575.

Specification of Letters Patent.

Patented Aug. 6, 1918.

Application filed July 10, 1915. Serial No. 39,184.

*To all whom it may concern:*

Be it known that I, ALBERT HENRY MIDGLEY, a subject of the King of Great Britain and Ireland, and residing at Warple Way, Acton Vale, in the county of Middlesex, England, have invented certain new and useful Improvements in and Relating to Electric Starters, of which the following is a specification.

This invention relates to an improved electric starter for internal combustion engines such as used on motor cars or the like, and of the kind in which use is made of a displaceable armature for coupling the shaft of the electric motor with the engine shaft and the displacement of which armature is effected by the axial pull exerted thereon by the field magnet.

In electric starters of the kind above referred to, the field is first strongly energized and the maximum current flowing through the armature reduced, until the shaft of the electric motor has been coupled with the engine shaft, whereupon the full working current is passed through the armature, and this has hitherto been attained by utilizing one and the same thick wire series winding for energizing the field before and after the coupling, said winding being used, owing to its low resistance, in series with a resistance to prevent short-circuiting of the battery, and by reducing the current flowing through the armature before the coupling by means of a resistance inserted in shunt with the armature. The electric energy consumed by the resistances referred to is not converted into any useful work and therefore constitutes a loss, and the main object of the present invention is to provide an improved arrangement by which this disadvantage is overcome while insuring at the same time a strong energization of the field during the coupling period of the starting operation without the battery being short-circuited.

By the use of many turns of thin wire during the first step of the starting operation, the field magnet is strongly magnetized, whereby a strong axial pull is exerted upon the armature while the voltage across the armature is thereby greatly reduced and the rotation imparted to the armature is consequently very slow. It will also be seen that in spite of the strong magnetization of the field magnet during this step of the starting operation, the current taken from the battery and flowing through the field excitation windings of the armature is greatly reduced as compared with the normal working current of the motor during the last part of the starting operation when the armature rotates to start the engine.

Figure 1:
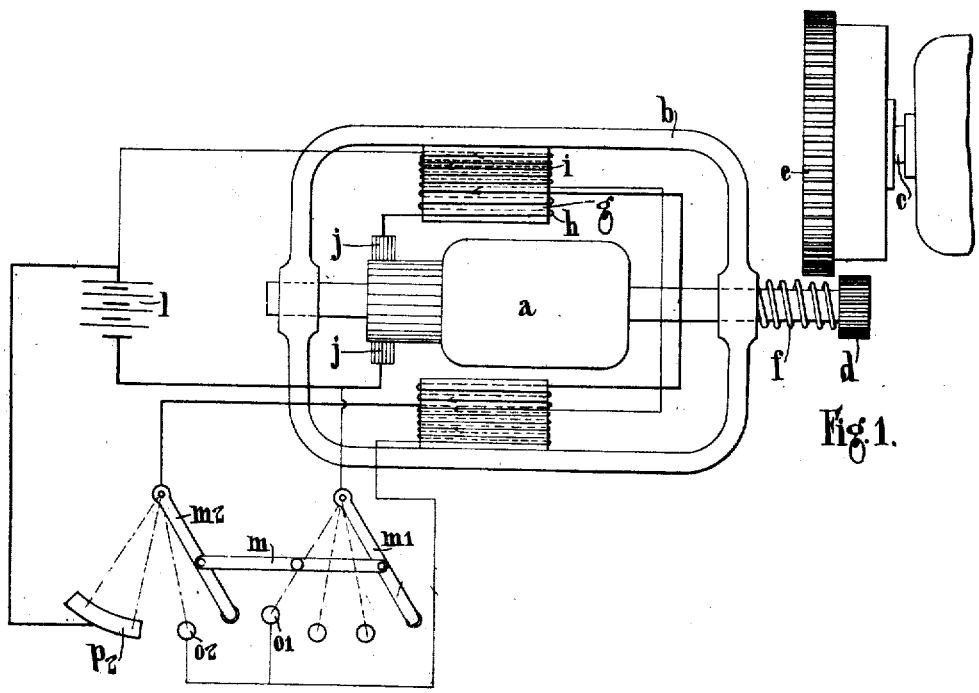
Figure 2:
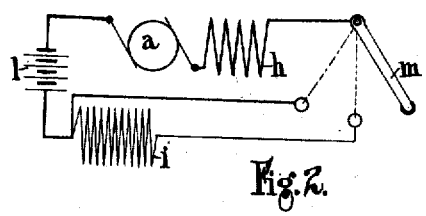
Figure 3:
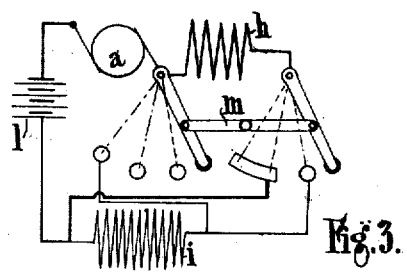

Figures 1 to 3 of the accompanying drawings illustrate diagrammatically and by way of example three different modes of carrying the invention into effect.

Referring to Fig. 1, $a$ is the armature which is displaceably mounted in the frame $b$ of the motor, its shaft being coupled with the shaft $c$ of the engine to be started by means of a toothed gear, the members $d$ and $e$ of which are mounted on the armature shaft and on the flywheel of the engine respectively. Each of the poles $g$ of the motor is provided with a thick wire winding $h$, and a thin wire winding $i$, similar to those of a series and shunt winding respectively, these windings being connected to the main brushes $j$ of the motor and with the battery $l$ through the intermediary of a switch $m$ provided with two contact arms $m_1$ and $m_2$.

The operation of the starter is as follows: When the switch $m$ is moved so that the arm $m_2$ makes contact with the stationary contact $o_2$, the poles $g$ are excited by means of the thin wire winding $i$ and thick wire winding $g$ which is arranged in series with the thin wire winding $i$ and in series with the armature $a$, whereby the armature is drawn into the field in order to bring the members $d$ and $e$ of the gear into engagement with each other. After the coupling of the armature shaft with the engine shaft through the intermediary of the gear, the switch $m$ is shifted in such a position that the contact arm $m_2$ makes contact with the stationary contact $p_2$, whereby the thin wire winding $i$ is disconnected from the circuit and the thick wire winding $h$ is left in series with the armature, the motor now running as an ordinary series motor. A further movement of the switch $m$ brings the contact arm $m_1$ into contact with the stationary contact $o_1$, the contact arm $m_2$ remaining in contact with the stationary contact $p_2$, whereby the thin wire winding $i$ is connected across the battery and the motor thus caused to operate as an ordinary compound motor.

When the engine starts to rotate under its own power, the magnetization of the field decreases and the armature *a* is axially moved in a direction opposite to that in which it moved during the starting operation, either by means of a spring *f* arranged as shown on the drawing, or by other suitable means which will cause the disengagement of the gear. For instance, the coupling and uncoupling of the armature and engine shafts may be effected by means of the spiral gear referred to in my application Serial No. 9717.

Referring to the modification illustrated in Fig. 2, the first movement of the switch *m* causes the thin wire winding *i* to be inserted in series with the armature and in series with the thick wire winding *h*, whereupon the thin wire winding *i* is disconnected, the machine now running as an ordinary series motor with the thick wire winding *h* in series with the armature and the battery.

In the modification illustrated in Fig. 3, the magnetic field is first excited by the two windings *h* and *i* in series with one another until the coupling of the armature shaft with the engine shaft has been effected, whereupon the thin wire winding *i* is disconnected, the machine now running as an ordinary series motor with the thick wire winding *h* in series with the armature. A further movement of the switch *m* causes the thin wire winding *i* to be inserted in parallel with the thick wire winding *h*, the machine now running as a series motor with two windings in parallel with each other.

The two windings *h* and *i* when used simultaneously in the various modifications above referred to may be arranged to act differentially instead of in the same sense.

Having now described my invention what I claim as new and desire to secure by Letters Patent is:—

1. A method of starting an internal combustion engine by means of an electric motor through the intermediary of a gear, one member of which is mechanically attached to the engine and the other member thereof to an axially displaceable armature of the motor which is drawn into the field by the magnetization of the poles, consisting in exciting the field by means of two excitation coils, the number of turns and the total resistance of the one coil being substantially greater than the number of turns and total resistance of the other coil, the field being excited first by means of the two excitation coils in series with each other and with the armature and source of energy, and then by the excitation coil having the smaller number of turns and the smaller total resistance in series with the armature and source of current, as and for the purpose set forth.

2. A method of starting an internal combustion engine by means of an electric motor through the intermediary of a gear, one member of which is mechanically attached to the engine and the other member thereof to an axially displaceable armature of the motor which is drawn into the field by the magnetization of the poles, consisting in exciting the field by means of two excitation coils, the number of turns and the total resistance of the one coil being substantially greater than the number of turns and total resistance of the other coil, the field being excited first by means of the two excitation coils in series with each other and with the armature and source of energy, then by the excitation coil having the smaller number of turns and the smaller total resistance in series with the armature and source of current, and finally also by the other excitation coil, as and for the purpose set forth.

3. A method of starting an internal combustion engine by means of an electric motor through the intermediary of a gear, one member of which is mechanically attached to the engine and the other member thereof to an axially displaceable armature of the motor which is drawn into the field by the magnetization of the poles, consisting in exciting the field by means of two excitation coils, the number of turns and the total resistance of the one coil being substantially greater than the number of turns and total resistance of the other coil, the field being excited first by means of the two excitation coils in series with each other and with the armature and source of energy, then by the excitation coil having the smaller number of turns and the smaller total resistance in series with the armature and source of current, the other excitation coil being disconnected and finally also by the latter excitation coil which is connected across the battery, as and for the purpose set forth.

In testimony whereof I have signed my name to this specification.

ALBERT HENRY MIDGLEY.